United States Patent Office 2,958,631
Patented Nov. 1, 1960

2,958,631
HYDROXYLATED STEROIDS AND METHODS FOR THEIR MANUFACTURE USING BACILLUS MEGATHERIUM

William Charney, Bloomfield, Hershel L. Herzog, Mountain View, and David Sutter, Clifton, N.J., assignors to Schering Corporation, Bloomfield, N.J., a corporation of New Jersey No Drawing. Filed June 12, 1959, Ser. No. 819,817
13 Claims. (Cl. 195—51)

The present invention relates to the preparation of steroids. More particularly, the present invention relates to the production of pregnenes and pregnadienes, having a hydroxyl group in the β-configuration at the 15-position.

It is an object of the invention to prepare 15 β-hydroxy steroids which are characterized by useful therapeutic activity or are capable of conversion into compounds having such activity.

This application is a continuation-in-part of our application Serial No. 619,693, filed November 1, 1956 and entitled "Hydroxylated Steroids and Methods for Their Manufacture."

The new compounds of our invention may be represented as steroids of the group consisting of:

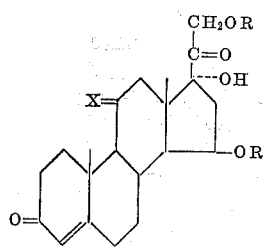

and

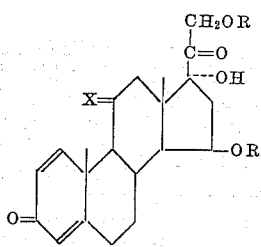

wherein X is a member of the group consisting of $H_2$, (H,αOH), (H,βOH) and O, and R is a member of the group consisting of H and acyl and preferably lower alkanoic acid radicals.

The term "acyl" as employed herein is intended, illustratively, to encompass those acyl radicals of organic acids containing from 1 to 16 carbon atoms. Thus included within this term are aliphatic (e.g. straight and branch chain alkyl), cycloaliphatic, heterocyclic and aromatic carboxy and sulfonyl substituents, such as for example, cyclohexane carboxylate, cyclopentyl propionate, nicotinate, furan-β-carboxylate, thiophene-α-carboxylate, acetate, propionate, butyrate, palmitate, methanesulfonate, isobutyrate, 2-methylheptanoate, benzoate, p-chlorophenoxyacetate, benzene-sulfonate and p-toluenesulfonate radicals.

The therapeutically useful compounds of the above formula are those wherein X represents H,βOH or O especially when accompanied by an additional double bond at C-1,2. These compounds are characterized by their ability to inhibit pituitary secretions and their usefulness in the treatment of infant diarrhea, prolonged emetic, anorexic and cachectic states and adrenocortical hormonal disorders. The corresponding 4-pregnenes exhibit similar properties to a diminished extent and are therefore preferably categorized with those compounds of the general formula wherein X equals $H_2$ or (H,αOH) as being intermediates which are useful in the preparation of the aforementioned therapeutically useful substances.

The following compounds are illustrative of those prepared in accordance with the practice of the present invention: 4-pregnene-15β,17α,21-triol-3,20-dione, 4-pregnene-15β,17α,21-triol-3,20-dione 15,21-diacetate, 1,4-pregnadiene-15β,17α,21-triol-3,20-dione, 4-pregnene-11β,15β,17α,21-tetrol-3,20-dione, 1,4-pregnadiene-11β,15β,17α,21-tetrol-3,20-dione, 4-pregnene-11α,15β,17α,21-tetrol-3,20-dione, 4-pregnene-15β,17α,21-triol-3,11,20-trione, 1,4-pregnadiene-11α,15β,17α,21-tetrol-3,20-dione, 1,4-pregnadiene-15β,17α,21-triol-3,11,20-trione, 1,4-pregnadiene-15β,17α,21-triol-3,11,20-trione 21-p-toluenesulfonate, 4-pregnene-11β,15β,17α,21-tetrol-3,20-dione 15,21-dinicotinate, 4-pregnene-15β,17α,21-triol-3,20-dione 21-butyrate.

The compounds of our invention may be prepared according to the following sequences:

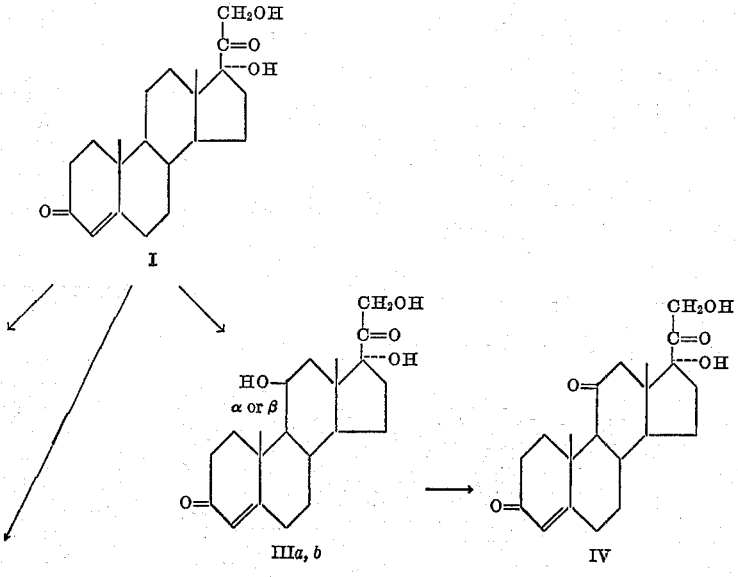

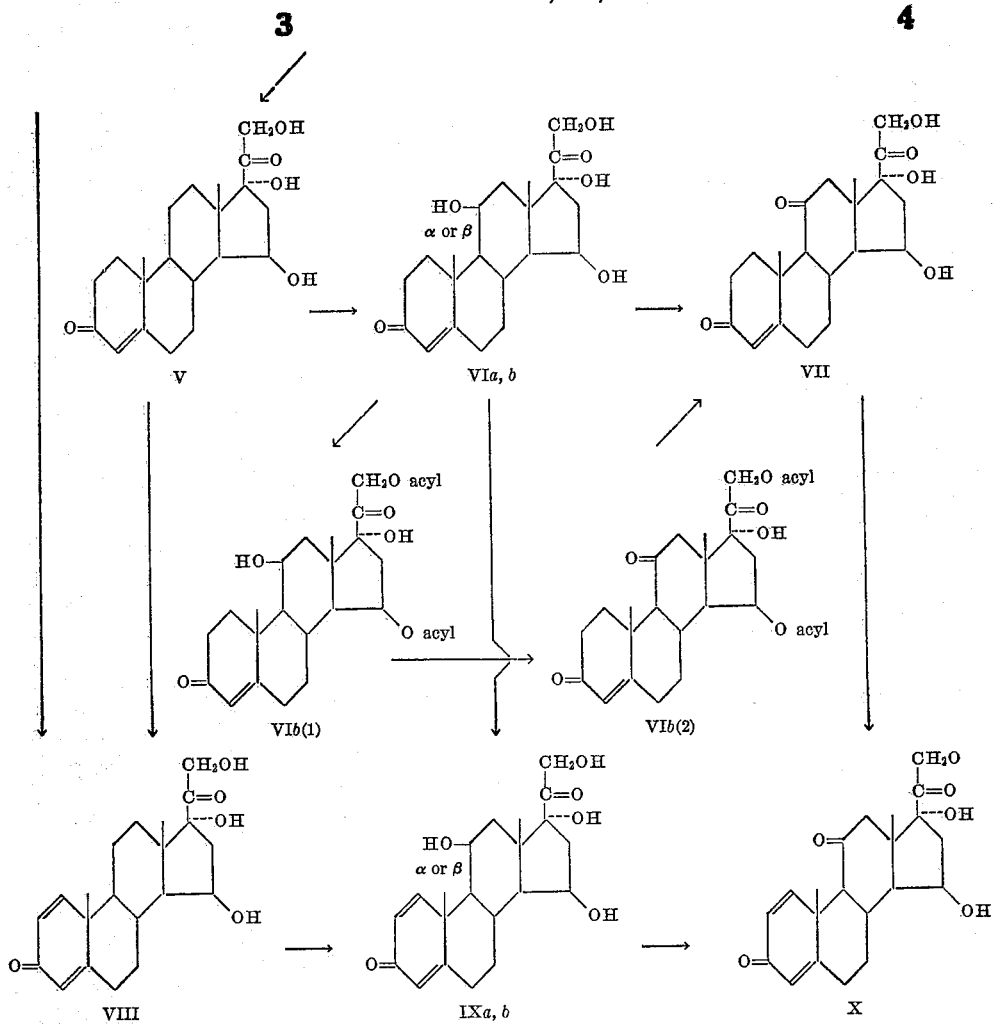

Reactions:
- A. 11-hydroxylation, α or β
- B. 11-oxidation
- C. 15β-hydroxylation
- D. Δ¹-dehydrogenation For the sake of brevity and clarity, all the reactants are shown to contain a free 21-hydroxy group and the products a free 15β-hydroxy group, although it is to be understood the 15β- and/or 21-ester react similarly. The esters may be prepared by simple esterification procedures as described in the examples. The starting materials are preferably 4-pregnene-17α,21-diol-3,20-dione (I), 1,4-pregnadiene-17α,21-diol-3,20-dione (II), 4-pregnene-11α,17α,21-triol-3,20-dione (IIIa), hydrocortisone (IIIb), or cortisone (IV), all of which are at least submitted to 15β-hydroxylation. The reaction scheme is indicative of the alternate methods of arriving at the preferred compounds of the invention. The sole limitation to the order of carrying out the various transformations is that the 15β-hydroxyl group is preferably introduced into an 11-oxygenated steroid prior to dehydrogenation of the A-ring, since we have found that reduction of the 1,2-bond occurs when an 11-oxygenated-1,4-pregnadiene is subjected to the action of the 15β-hydroxylating microorganism.

Thus, according to the equations, compound I may be hydroxylated in the 15β-position giving rise to 4-pregnene-15β,17α,21-triol-3,20-dione (V). Microbiological dehydrogenation of V according to procedures later described yields the diene VIII which may be hydroxylated in the 11-position according to known procedures, yielding IXa and IXb. Both IXa and IXb are convertible by selective oxidation of the 11-hydroxyl group into 1,4-pregnadiene-15β,17α,21-triol-3,11,20-trione (X).

Alternatively, compound I may be first dehydrogenated at the C-1,2-position yielding II which is transformed in turn to VIII by 15β-hydroxylation. Similarly, one may start with IIIa, IIIb or V which upon conversion to their respective 15β-hydroxyl analogs VIa, VIb and VII can be subjected to Δ¹-dehydrogenation or other transformations indicated in the reaction scheme.

In all of the reaction sequences described above and in the schematic diagram, it is obvious that there are certain transformations which may be performed, namely:

(a) 11-hydroxylation, α or β.
(b) Oxidation of an 11-hydroxyl group to an 11-keto.
(c) Introduction of a 15β-hydroxyl group.
(d) Introduction of a Δ¹-bond.

As indicated heretofore, the order of carrying out a particular transformation depends merely on which compound of the invention is desired with the sole proviso that 15β-hydroxylation precedes Δ¹-dehydrogenation in an 11-oxygenated steroid e.g. 4-pregnene. Thus 15β-hydroxylation performed in accordance with the practice of the present invention is preferably carried out with 11-desoxy 4-pregnenes, 11-desoxy 1,4-pregnadienes and 11-oxygenated 4-pregnenes.

All of the steps described in the schematic diagrams with the exception of the 15β-hydroxylation are known for analogous compounds are may be applied similarly. For example, the introduction of an 11α-hydroxyl group at any point described in the foregoing series of transformations is effected preferably by the action of a culture, or of the enzymatic material, or extract of *Rhizopus nigricans* in the manner described in U.S. Patent No. 2,602,769 dated July 8, 1952. Other 11α-hydroxylating organisms such as *Aspergillus niger, Rhizopus arrhizus* and the like may be used.

The introduction of the 11β-hydroxyl group is effected in like manner with the microorganism *Curvularia lunata* as described in U.S. Patent No. 2,658,023, dated November 3, 1953. Oxidation of an 11-hydroxyl group and preferably the 11β-hydroxyl group to an 11-keto group is conveniently performed at any of the steps designated by means of reagents such as chromic acid in acetone or in pyridine as described by Poos et al., J.A.C.S., 75: 422 (1953). This procedure requires protective esterification of the 21-hydroxyl group, and preferably of the 15β-hydroxy position as well. This is normally effected by acylation, e.g. acetylation, thereof. The 11-hydroxyl function may be oxidized in the presence of a free 21-OH group by means of agents such as N-bromsuccinimide and N-bromacetamide.

Dehydrogenation of the A-ring whereby a double bond is inserted at C-1,2 is preferably performed microbiologically utilizing *Bacillus sphaericus* (A.T.C.C. 7055) or *Corynebacterium simplex* (A.T.C.C. 6946), according to analogous procedures described in Belgian Patent 540,748. Subjecting a 4-pregnene to the dehydrogenating action of these organisms at any of the stages indicated in the reaction sequence according to the teaching of the Belgian patent yields the corresponding 1,4-pregnadiene.

We have found that a 15β-hydroxyl group may be introduced into steroids especially those containing substituents described heretofore by incubating or fermenting the steroid with a culture medium containing *Bacillus megatherium*, or the enzymatic extract thereof. Although various strains or variants of this microorganism will carry out the desired oxygenation, we prefer to use the strain identified as *Bacillus megatherium* (Isolate 41, Waksman Collection, Institute of Microbiology, Rutgers University, New Brunswick, New Jersey). A suitable nutrient medium containing organic nitrogen, co-factors and inorganic salts is necessary to obtain a desirable growth of *Bacillus megatherium*. After optimum growths, the cell mass may be conveniently separated by centrifuging the nutrient broth, decanting the supernatant liquid and suspending the cell mass so obtained in saline solution. A portion of the cell suspension may then be utilized as seed in a nutrient medium for supporting growth of the microorganism. The nutrient medium may be yeast extract (Difco), casein hydrolysate (N-Z-Amine), corn steep liquor, fish solubles and the like. The steroid substrate as a solid, suspension, or solution in alcohol, acetone or other water-miscible solvent which is non-toxic towards the organism, is under sterile conditions, added to the growing microorganism in a broth medium. In order to promote the growth of the organism, the culture is shaken and aerated. The order of mixing the substrate with the organism is not critical for the steroid may be added to the broth medium and then inoculated with bacterium, or the growing bacterium may be added to the steroid in broth medium. Alternatively, enzyme preparations obtained from cultures of *Bacillus megatherium* may be used in our process. We prefer to cultivate the microorganism in a nutrient agar from which the seed culture is obtained and subculture in yeast extract and cerelose mixture at about 28° C. We have further found that optimum growth is obtained after about 16 hours, and optimum transformation occurring 24 hours after addition of substrate. As indicated heretofore, any water-miscible solvent which is non-toxic to the organism may be employed to dissolve or suspend the steroid, however, we prefer to use ethanol in such quantities that the final concentration of solvent in the reaction mixture is less than about 5 percent.

The products of the reaction, after completion of the oxygenation, may be recovered by extraction with a suitable solvent by filtration, by adsorption on a suitable adsorbent or by other procedures commonly used in the art. For example, in extraction, chlorinated hydrocarbons, ketones and alcohols, such as chloroform, methylene chloride, butanol, diethylketone and the like may be used. Following extraction, the products may be isolated by concentration of the extracts and purification accomplished by recrystallization from a suitable solvent, for example, acetone, acetone-hexane, methylene chloride, ethanol, etc. Where several products are formed in the same reaction, separation is conveniently accomplished by chromatography on adsorbents such as silica gel, alumina and the like.

The compounds of this invention may be administered parenterally in the form of therapeutically acceptable solutions and suspensions. Where oral administration is indicated, the substances may be easily compounded into tablets, elixirs and other common pharmaceutical dosage forms.

The following examples more fully describe the preparations of the compounds of this invention. However, they are presented for illustrative purposes only and in no way shall be construed as limiting the scope of this invention except as defined in the appended claims.

EXAMPLE 1

*4-pregnene-15β,17α,21-triol-3,20-dione*

A medium prepared from 10 g. of yeast extract (Difco) and 10 g. of cerelose is diluted to 1 liter with tap water and distributed equally among ten 300 ml. Erlenmeyer flasks. The flasks and contents are sterilized and each is inoculated with 1 ml. suspension of *Bacillus megatherium* (Isolate 41, Waksman Collection, Institute of Microbiology, Rutgers University, New Brunswick, N.J.) from a 24 hour broth culture on nutrient agar. The newly-seeded cultures are incubated and shaken on a shake table for 16 hours at 28° C. at 220 r.p.m. To each of the flasks is added, under sterile conditions, a mixture of 25 mg. of 4-pregnene-17α,21-diol-3,20-dione in 0.5 ml. of 80% aqueous ethanol and fermentation is permitted to occur for an additional 24 hours while shaking. At the end of this period, paper chromatography according to the procedure of Shull, Abstracts of Papers at the 126th Meeting of the American Chemical Society, Sept. 12–17, 1954, N.Y., p. 9A, indicates the disappearance of the starting material and the formation of a single product which absorbs in the U. V. and stains with red tetragolium. The reaction mixture is extracted thoroughly with chloroform and the extracts are washed with water, dried and concentrated to a residue. The residue is crystallized and recrystallized from acetone-hexane and acetone, respectively, yielding the 15β-hydroxy steroid of this example, M.P. 240–241° C. dec., $[\alpha]_D^{25}+103°$ (ethanol), $$\lambda_{max.}^{methanol} \; 242 \; m\mu \; (E=16,600)$$

$$\lambda_{max.}^{Nujol} \; 2.91 \; \mu, \; 5.83 \; \mu, \; 6.01 \; and \; 6.18 \; \mu$$

The melting point of the compound of this example may vary from ranges of 216–220° C. dec. to 253–255° C. dec. indicating polymorphic variation.

EXAMPLE 2

*4-pregnene-15β,17α,21-triol-3,20-dione 21-acetate*

To a solution of 130 mg. of the compound of Example 1 in 4 ml. of pyridine is added 44 mg. of acetic anhydride. The reaction mixture is allowed to stand for 2 to 3 hours whereupon it is poured into water and the precipitate removed by filtration. The crude acetate is recrystallized from acetone-hexane, M.P. 244–246° C. dec., $[\alpha]_D^{25}+92°$ (ethanol), $$\lambda_{max.}^{ethanol} \; 242 \; m\mu \; (E=17,700)$$

$\lambda_{max.}^{Nujol}$ 2.86 and 2.96 $\mu$, 5.72, 5.77, 5.82 $\mu$, 6.06, 6.20 and 8.10 $\mu$.

EXAMPLE 3

*4-pregnene-15β,17α,21-triol-3,20-dione 15,21-diacetate*

A solution of 260 mg. of the compound obtained in Example 1 in 6 ml. of pyridine is treated with 3 ml. of acetic anhydride and allowed to stand overnight at room temperature. The reaction mixture is diluted with water and the precipitate so obtained by filtration is recrystallized from acetone-hexane. Recrystallization is preferably carried out by slow concentration of the solvent with the first crop of crystals consisting of primarily the mono-21-acetate and the diacetate of this example crystallizing from later crops, M.P. 193–197° C. Recrystallization from acetone-hexane yields the pure diacetate of this example, M.P. 202–207° C. $[\alpha]_D^{25}+54°$ (ethanol).

EXAMPLE 4

1,4-pregnadiene-15β,17α,21-triol-3,20-dione

Bacillus sphaericus (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28° C.

To 100 ml. of a sterile nutrient broth (composed of Bacto-beef extract, 3 g.; Bacto-peptone, 5 g.; per liter of tap water) in a 300 ml. flask is added 1 ml. of the incubated culture and the broth mixture is further incubated for 24 hours at 28° C. on a shaking machine. The broth culture so obtained is employed as an inoculum.

Into each of 10 flasks containing 100 ml. of sterile nutrient broth is added 1 ml. of the inoculum. The flasks are agitated on a rotary shaker for 8 hours at 28° C. at 240 strokes per minute. At the end of this growth period, a mixture of 25 mg. of the compound of Example 1 in 0.5 ml. of ethanol is aseptically added to each flask which, in turn, is reshaken and incubated for an additional 24 hours.

The contents of the flasks are then combined and extracted three times with 2 liters of chloroform per extraction. The combined chloroform extracts are evaporated to dryness and the residue is recrystallized from acetone yielding the pregnadiene of this example.

EXAMPLE 5

4-pregnene-11β,15β,17α,21-tetrol-3,20-dione

A medium prepared from 10 g. yeast extract (Difco) and 10 g. of cerelose is diluted to 1 liter with tap water and distributed equally among ten 300 ml. Erlenmeyer flasks. The flasks and contents are sterilized and each is inoculated with a 1 ml. suspension of Bacillus megatherium (Isolate 41, Waksman Collection, Institute of Microbiology, Rutgers University, New Brunswick, N. J.) from a 24-hour broth culture on nutrient agar. The newly-seeded cultures are incubated and shaken on a shake table for 16 hours at 28° C. at 220 r.p.m. To each of the flasks is added, under sterile conditions, a mixture of 25 mg. of 4-pregnene-11β,17α,21-triol-3,20-dione in 0.5 ml. of 80% aqueous ethanol and fermentation is permitted to occur for an additional 24-hours while shaking. At the end of this period, paper chromatography according to the procedure of Shull, Abstracts of Papers at the 126th Meeting of the American Chemical Society, Sept. 12–17, 1954, N. Y., page 9A, indicates the disappearance of the starting material and the formation of a single product which absorbs in the U.V. and stains with red tetrazolium. The reaction mixture is extracted thoroughly with chloroform and the extracts are washed with water, dried and concentrated to a residue. The residue is crystallized and recrystallized from acetone-hexane and acetone, respectively, yielding the 15β-hydroxy steroid of this example, 4-pregnene-11β,15β,17α,21-tetrol-3,20-dione.

EXAMPLE 6

4-pregnene-11β,15β,17α,21-tetrol-3,20-dione 21-acetate

To a solution of 130 mg. of the compound of Example 5 in 4 ml. of pyridine is added 4 mg. of acetic anhydride. The reaction mixture is allowed to stand for about 2 hours whereupon it is introduced into water and the resultant precipitate removed by filtration. The crude product, 4-pregnene-11β,15β,17α,21-tetrol-3,20-dione 21-acetate, is recrystallized from acetone-hexane.

EXAMPLE 7

4-pregnene-11β,15β,17α,21-tetrol-3,20-dione 15,21-diacetate

A solution composed of 260 mg. with the compound obtained in Example 6 and 6 ml. of pyridine is treated with 3 ml. of acetic anhydride and allowed to stand overnight at room temperature. The reaction mixture is diluted with water and the precipitate so obtained by filtration is recrystallized from acetone-hexane. Recrystallization is carried out by increased concentration of the solvent by the slow introduction of the crystals initially obtained by recrystallization and the continued introduction of the later formed crystals in the recrystallization process above referred to. Recrystallization of this latter compound yields the pure diacetate, 4-pregnene-11β,15β,17α,21-tetrol-3,20-dione 15,21-diacetate.

EXAMPLE 8

1,4-pregnadiene-11β,15β,17α,21-tetrol-3,20-dione 4-pregnene-11β,15β,17α,21-tetrol-3,20-dione is aseptically introduced into each of ten flasks containing a culture of Bacillus sphaericus (A.T.C.C. 7055) in accordance with the procedure described in Example 4. The contents of the flasks are then combined and extracted 3 times with 2 l. of chloroform per extract. The combined chloroform extracts are evaporated to dryness and the residue recrystallized from acetone yielding the compound of this example, 1,4-pregnadiene-11β,15β,17α,21-tetrol-3,20-dione.

EXAMPLE 9

1,4-pregnadiene-11β,15β,17α,21-tetrol-3,20-dione 21-acetate

To a solution of 130 mg. of the compound of the preceding example, Example 8, in 4 ml. of pyridine is added 44 mg. of acetic anhydride. The reaction mixture is allowed to stand for about 2 hours whereupon it is poured into water and the precipitate removed by filtration. The crude acetate, 1,4-pregnadiene-11β,15β,17α,21-tetrol-3,20-dione 21-acetate, is recrystallized from acetone-hexane.

EXAMPLE 10

1,4-pregnadiene-11β,15β,17α,21-tetrol-3,20-dione 15,21-diacetate

Following the procedure of Example 3 wherein 1,4-pregnadiene-11β,15β,17α,21-tetrol-3,20-dione is substituted for 4-pregnene-15β,17α,21-triol-3,20-dione, the compound, 1,4-pregnadiene-11β,15β,17α,21-tetrol-3,20-dione 15,21-diacetate is obtained.

EXAMPLE 11

4-pregnene-11α,15β,17α,21-tetrol-3,20-dione

A medium prepared from 10 g. of yeast extract (Difco) and 10 g. of cerelose is diluted to 1 l. with tap water and distributed equally among ten 300 ml. Erlenmeyer flasks. The flasks and contents are sterilized and each is inoculated with a 1 ml. suspension of Bacillus megatherium (Isolate 41, Waksman Collection, Institute of Microbiology, Rutgers University, New Brunswick, N.J.) from a 24-hour broth culture on nutrient agar. The newly-seeded cultures are incubated and shaken on a shake table for 16 hours at 28° C. at 220 r.p.m. To each of the flasks is added, under sterile conditions, a mixture of 25 mg. of 4-pregnene-11α,17α,21-triol-3,20-dione in 0.5 ml. of 80% aqueous ethanol and fermentation is permitted to occur for an additional 24 hours while shaking. At the end of this period, paper chromatography according to the procedure of Shull, Abstracts of Papers at the 126th Meeting of the American Chemical Society, Sept. 12–17, 1954, N.Y., p. 9A, indicates the disappearance of the starting material and the formation of a single product which absorbs in the U. V. and stains with red tetrazolium. The reaction mixture is extracted thoroughly with chloroform and the extracts are washed with water, dried and concentrated to a residue. The residue is crystallized and recrystallized from acetone-hexane and acetone, respectively, yielding the 15β-hydroxy steroid of this example, 4-pregnene-11α,15β,17α,21-tetrol-3,20-dione.

EXAMPLE 12

4-pregnene-15β,17α,21-triol-3,11,20-trione

A medium prepared from 10 g. of yeast extract (Difco) and 10 g. of cerelose is diluted to 1 l. with tap water and distributed equally among ten 300 ml. Erlenmeyer flasks. The flasks and contents are sterilized and each is inoculated with a 1 ml. suspension of *Bacillus megatherium* (Isolate 41, Waksman Collection, Institute of Microbiology, Rutgers University, New Brunswick, N.J.) from a 24-hour broth culture on nutrient agar. The newly-seeded cultures are incubated and shaken on a shake table for 16 hours at 28° C. at 220 r.p.m. To each of the flasks is added, under sterile conditions, a mixture of 25 mg. of 4-pregnene-17α,21-diol-3,11,20-trione in 0.5 ml. of 80% aqueous ethanol and fermentation is permitted to occur for an additional 24 hours while shaking. At the end of this period paper chromatography according to the procedure of Shull, Abstracts of Papers at the 126th Meeting of the American Chemical Society, Sept. 12–17, 1954, N.Y., p. 9A, indicates the disappearance of the starting material and the formation of a single product which absorbs in the U. V. and stains with red tetrazolium. The reaction mixture is extracted thoroughly with chloroform and the extracts are washed with water, dried and concentrated to a residue. The residue is crystallized and recrystallized from acetone-hexane and acetone, respectively, yielding the 15β-hydroxy steroid, 4-pregnene-15β,17α,21-triol-3,11,20-trione.

EXAMPLE 13

1,4-pregnadiene-11α,15β,17α,21-tetrol-3,20-dione

Following the procedure of Example 4, 4-pregnene-11α,15β,17α,21-tetrol-3,20-dione is subjected to the oxygenating action of *Bacillus sphaericus* (A.T.C.C. 7055) to yield 1,4-pregnadiene-11α,15β,17α,21-tetrol-3,20-dione.

EXAMPLE 14

1,4-pregnadiene-15β,17α,21-triol-3,11,20-trione

Following the procedure of Example 4, 4-pregnene-15β,17α,21-triol-3,11,20-trione is subjected to the oxygenating activity of *Bacillus sphaericus* (A.T.C.C. 7055) to yield 1,4-pregnadiene-15β,17α,21-triol-3,11,20-trione.

EXAMPLE 15

4-pregnene-15β,17α,21-triol-3,20-dione

A culture medium composed of 10 g. of yeast extract (Difco) and 10 g. of cerelose diluted with 1 l. of tap water is distributed in equal portions in ten 300 ml. Erlenmeyer flasks. One milliliter suspensions of *Bacillus megatherium* (Isolate 41, Waksman Collection, Institute of Microbiology, Rutgers University, New Brunswick, N.J.) are inoculated aseptically into each of the previously sterilized flasks. The microorganism, *Bacillus megatherium*, thus introduced is obtained from a 24 hour broth culture on nutrient agar. The flasks containing the newly seeded cultures are incubated and aerated by shaking for 17 hours at 28° C. and 220 r.p.m. A mixture of 25 mg. of 4-pregnene-17α,21-diol-3,20-dione in 0.5 ml. of 80% aqueous ethanol is introduced aseptically in each of these flasks and fermentation permitted to occur for 24 hours while shaking is continued. A single product results together with the disappearance of the starting material, 4-pregnene-17α,21-diol-3,20-dione, as evidenced by paper chromatography according to the method of Shull referred to hereinabove, U. V. and staining with red tetrazolium. The reaction mixture is extracted with chloroform and the resultant extracts washed with water, dried and concentrated. The resultant residue is sequentially crystallized from acetone-hexane and acetone. The crystalline product obtained is 4-pregnene-15β,17α,21-triol-3,20-dione, M.P. 218° C.–220° C. dec., $[\alpha]_D^{25}$ + 103° (ethanol)

$\lambda_{max}^{methanol}$ 242 mμ (E=16,600)

$\lambda_{max}^{Nujol}$ 2.91 μ, 5.83 μ, 6.01 and 6.18 μ

EXAMPLE 16

4-pregnene-11β,15β,17α,21-tetrol-3,20-dione

A culture of *Curvularia lunata* (QM 120h) is grown in flasks containing the following medium:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

One hundred milliliters of this inoculum is then added aseptically to 2 l. of the following medium:

| | Percent |
|---|---|
| Sucrose | 1 |
| Difco tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

This mixture is adjusted to pH 7 with sulfuric acid and 0.25% calcium carbonate, the latter being added prior to sterilization. The inoculated medium is aerated at the rate of about ½ to 1 volume of air per minute at 27° C. to 28° C. for 24 hours. During this time the mixture is stirred at the rate of about 1700 r.p.m. One half gram of 4-pregnene-15β,17α,21-triol-3,20-dione is dissolved in 20 ml. of 95% ethanol. The solution is then added to the fermentation mixture under sterile conditions. The reaction is then continued for a further 24 hours under the same conditions as described above, i.e. 27° C. to 28° C. with shaking to effect aeration. The whole fermentation mixture is removed from the fermentation vessel and the mixture extracted twice with an equal volume of ethylene dichloride at 70° C. The resultant extracts are combined and evaporated to dryness. The dry solids are dissolved in a small volume of methylene chloride and the solution added to a column of silica gel wherein each column of silica gel has been previously treated with 1 ml. of 95% ethanol. This mixture is suspended in methylene chloride and poured into a chromatographic column. After the steroid mixture is introduced into the column it is washed with several portions of methylene chloride to remove fats and pigments. The column is then developed by adding a mixture of 97 volumes of methylene chloride and 3 volumes of ethanol. The eluate is divided into a series of small fractions. These fractions are analyzed by the paper chromatographic system of Shull referred to hereinabove, and those fractions containing the same compound combined. The initially recovered material from the column was unreacted starting material, 4-pregnene-15β,17α,21-triol-3,20-dione. The terminal flasks recovered from the chromatographic column are the desired product 4-pregnene-11β,15β,17α,21-tetrol-3,20-dione.

EXAMPLE 17

4-pregnene-11β,15β,17α,21-tetrol-3,20-dione 15,21-diacetate

A solution of 260 mg. of 4-pregnene-11β,15β,17α21-tetrol-3,20-dione prepared by the method described in Example 16 and 6 ml. of pyridine is treated with 3 ml.

of acetic anhydride and allowed to stand overnight at room temperature. The reaction mixture is diluted with water and the precipitate so obtained by filtration is recrystallized from acetone-hexane. Recrystallization is carried out by increased concentration of the solvent by the slow introduction of the crystals initially obtained by recrystallization and the continued introduction of the later formed crystals in the recrystallization process above referred to. Recrystallization of this latter compound yields the pure diacetate, 4-pregnene-11β,15β,17α,21-tetrol-3,20-dione 15,21-diacetate.

EXAMPLE 18

*4 - pregnene - 15β,17α,21 - triol - 3,11,20 - trione 15β,21-diacetate*

To a solution of 0.2 g. of 4-pregnene-11β,15β,17α,21-tetrol-3,20-dione 15β,21-diacetate prepared by the method described in Example 17, there is added 10 ml. of acetic acid and a solution of 40 ml. of chromium trioxide in 1 ml. of water and 2 ml. of acetic acid. The resultant mixture is allowed to stand for a period of about 6 hours at which time it is diluted with water and extracted with methylene chloride. The organic extracts are washed with water dried over magnesium sulfate filtered and evaporated to a residue which is crystallized from methanol to yield 4-pregnene-15β,17α,21-triol-3,11,20-trione 15β,21-diacetate.

EXAMPLE 19

*4-pregnene-15β,17α,21-triol-3,11,20-trione*

One gram of 4-pregnene-15β,17α,21-triol-3,11,20-trione 15β,21-diacetate prepared by the procedure described in Example 18 is dissolved in about 25 ml. of methanol and 5 ml. of water containing 0.2 g. of potassium bicarbonate. This solution is refluxed for 30 minutes then concentrated under reduced pressure. Water is added to the residue and the resultant precipitate filtered and dried. Crystallization from acetone-hexane yields 4-pregnene-15β,17α,21-triol-3,11,20-trione.

EXAMPLE 20

*1,4-pregnadiene-15β,17α,21-triol-3,11,20-trione*

4-pregnene-15β,17α,21-triol-3,11,20-trione is aseptically added to each of 10 flasks containing a culture of *Bacillus sphaericus* (A.T.C.C. 7055) in accordance with the procedure described in Example 4. The contents of the flasks are then combined and extracted 3 times with 2 l. of chloroform per extraction. The combined chloroform extracts are evaporated to dryness and the residue recrystallized from acetone yielding the compound, 1,4-pregnadiene-15β,17α,21-triol-3,11,20-trione.

We claim:

1. A process for preparing a 15β-hydroxy steroid which comprises subjecting a 15-desoxy steroid to the oxygenating action of the microorganism *Bacillus megatherium*.

2. A process for preparing a 15β-hydroxy-4-pregnene which comprises subjecting a 15-desoxy-4-pregnene to the oxygenating action of the microorganism *Bacillus megatherium*.

3. A process for introducing a 15β-hydroxy substituent into a steroid selected from the group consisting of 11-desoxy-4-pregnenes, 11-desoxy-1,4-pregnadienes and 11-oxygenated-4-pregnenes which comprises subjecting a member of said group to the oxygenating action of the microorganism *Bacillus megatherium*.

4. A process for introducing a 15β-hydroxy substituent into a steroid selected from the group consisting of 4-pregnene-17α,21-diol-3,20-dione and the acyl derivatives thereof which comprises subjecting a member of the said group to the oxygenating action of the microorganism *Bacillus megatherium*.

5. The process of claim 4 wherein the steroid is 4-pregnene-17α,21-diol-3,20-dione 21-acetate.

6. The process of claim 4 wherein the steroid is 4-pregnene-17α,21-diol-3,20-dione 17,21-diacetate.

7. A process for introducing a 15β-hydroxy substituent into a steroid selected from the group consisting of 1,4-pregnadiene-17α,21-diol-3,20-dione and the acyl derivatives thereof which comprises subjecting a member of said group to the oxygenating action of the microorganism *Bacillus megatherium*.

8. A process for introducing a 15β-hydroxy substituent into a steroid selected from the group consisting of 4-pregnene-11β,17α,21-triol-3,20-dione and the acyl derivatives thereof which comprises subjecting a member of said group to the oxygenating action of the microorganism *Bacillus megatherium*.

9. A process for introducing a 15β-hydroxy substituent into a steroid selected from the group consisting of 1,4-pregnadiene-11β,17α,21-triol-3,20-dione and the acyl derivatives thereof which comprises subjecting a member of said group to the oxygenating action of the microorganism *Bacillus megatherium*.

10. A process for introducing a 15β-hydroxy substituent into a steroid selected from the group consisting of 4-pregnene-11α,17α,21-triol-3,20-dione and the acyl derivatives thereof which comprises subjecting a member of said group to the oxygenating action of the microorganism *Bacillus megatherium*.

11. A process for introducing a 15β-hydroxy substituent into a steroid selected from the group consisting of 4-pregnene-17α,21-diol-3,11,20-trione and the acyl derivatives thereof which comprises subjecting a member of said group to the oxygenating action of the microorganism *Bacillus megatherium*.

12. A process for introducing a 15β-hydroxy substituent into a steroid selected from the group consisting of 1,4-pregnadiene-11α,17α,21-triol-3,20-dione and the acyl derivatives thereof which comprises subjecting a member of said group to the oxygenating action of the microorganism *Bacillus megatherium*.

13. A process for introducing a 15β-hydroxy substituent into a steroid selected from the group consisting of 1,4-pregnadiene-17α,21-diol-3,11,20-trione and the acyl derivatives thereof which comprises subjecting a member of said group to the oxygenating action of the microorganism *Bacillus megatherium*.

References Cited in the file of this patent

UNITED STATES PATENTS

| | | |
|---|---|---|
| 2,833,797 | Hershberg | May 6, 1958 |
| 2,844,513 | Wettstein et al. | July 22, 1958 |

FOREIGN PATENTS

| | | |
|---|---|---|
| 218,946 | Australia | Nov. 27, 1956 |